US009371027B2

(12) United States Patent
Dickerson

(10) Patent No.: US 9,371,027 B2
(45) Date of Patent: Jun. 21, 2016

(54) VEHICLE BODY WITH A CURVED METAL PLATE FLOOR

(71) Applicant: Alan William Dickerson, Mount Eliza (AU)

(72) Inventor: Alan William Dickerson, Mount Eliza (AU)

(*) Notice: Subject to any disclaimer, the term of this patent is extended or adjusted under 35 U.S.C. 154(b) by 0 days.

(21) Appl. No.: 14/164,326

(22) Filed: Jan. 27, 2014

(65) Prior Publication Data

US 2014/0312651 A1    Oct. 23, 2014

Related U.S. Application Data

(63) Continuation of application No. PCT/AU2012/000867, filed on Jul. 23, 2012.

(30) Foreign Application Priority Data

Jul. 25, 2011    (AU) .............................. 2011902965

(51) Int. Cl.
*B62D 33/02* (2006.01)
*B60P 1/28* (2006.01)

(52) U.S. Cl.
CPC .................. *B60P 1/286* (2013.01); *B62D 33/02* (2013.01)

(58) Field of Classification Search
CPC ........................................ B60P 1/286
USPC ........................................ 296/183.2
See application file for complete search history.

(56) References Cited

U.S. PATENT DOCUMENTS

2008/0018135 A1    1/2008    Risner

FOREIGN PATENT DOCUMENTS

| CN | 104057660 A | * | 9/2014 |
|---|---|---|---|
| EP | 1488988 | | 12/2004 |
| WO | 2006102714 | | 10/2006 |

OTHER PUBLICATIONS

International Preliminary Report on Patentability from the International Preliminary Examining Authority for Application No. PCT/AU2012/000867 dated Nov. 4, 2013 (8 pages).
International Search Report for Application No. PCT/AU2012/000867 completed Aug. 20, 2012 (3 pages).

* cited by examiner

*Primary Examiner* — H Gutman
(74) *Attorney, Agent, or Firm* — Michael Best & Friedrich LLP

(57) ABSTRACT

A load carrying body for a vehicle includes a curved metal plate floor (10) and a floor attachment system that attaches the floor to opposite sides of the body so that the floor is suspended between the sides. The floor attachment system includes a plurality of tensile members (38) which are the principal means for transferring forces from the floor to the remainder of the body. Each tensile member is coupled at one end to one of the sides of the body of the vehicle and at the other end to a side edge of the floor.

37 Claims, 18 Drawing Sheets

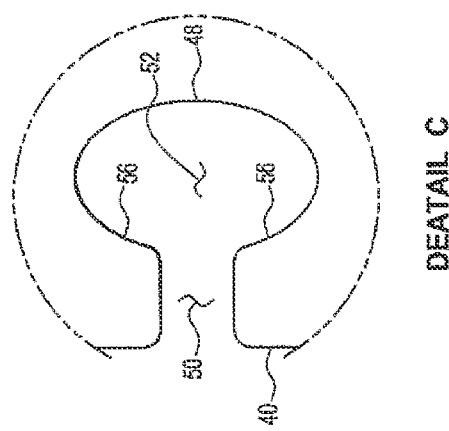
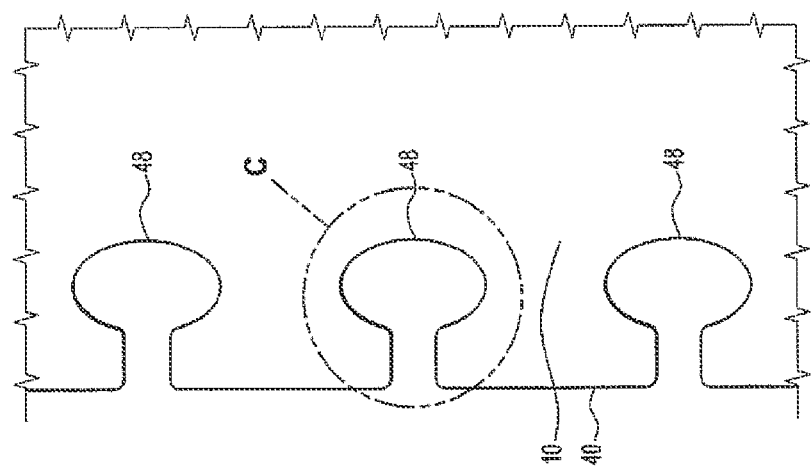

DEATAIL C

SECTION 12-12

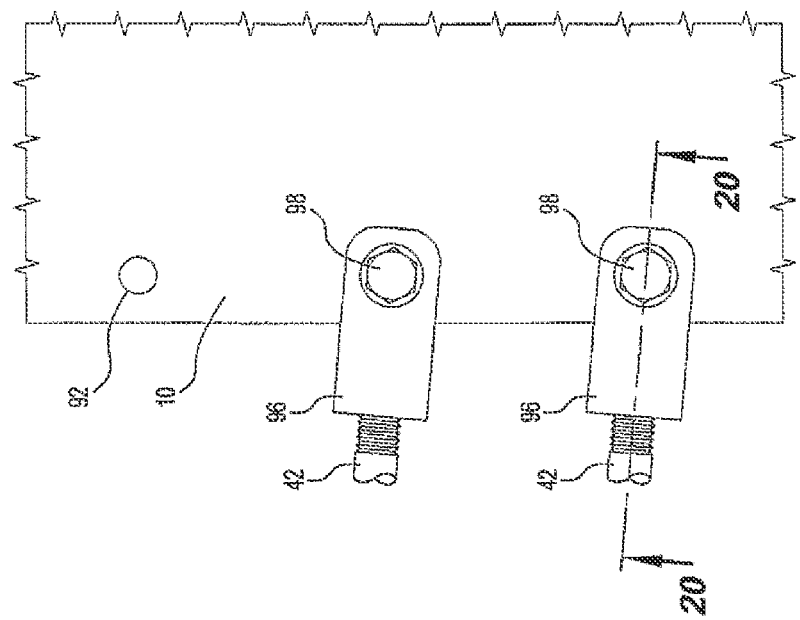
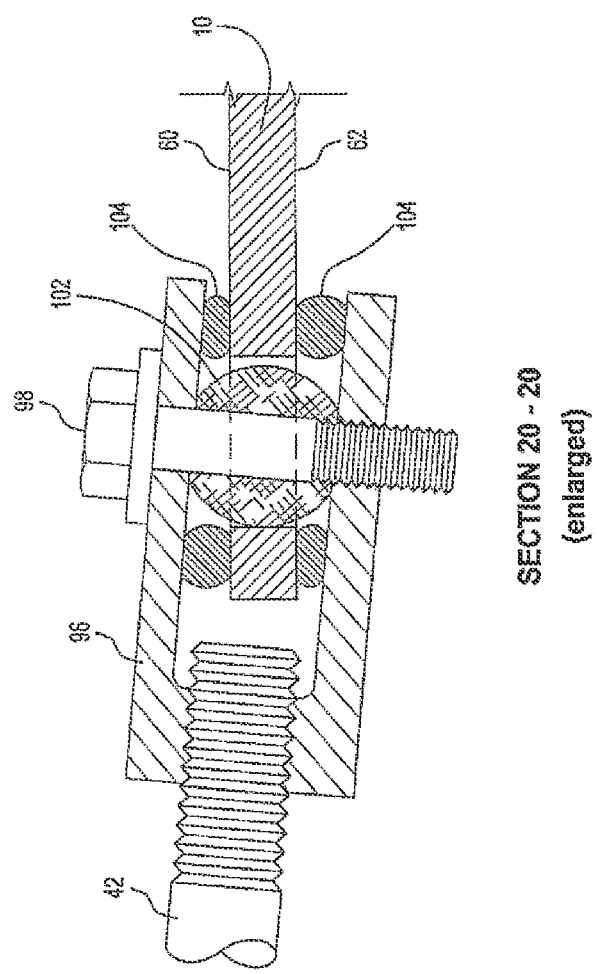
FIG. 20

VEHICLE BODY WITH A CURVED METAL PLATE FLOOR

BACKGROUND OF THE INVENTION

The present invention relates to a vehicle body with a curved metal plate floor.

The present invention relates particularly, although by no means exclusively, to a system for attaching a curved metal plate floor to a support frame of a load carrying body of a vehicle, such as a truck or a rail wagon.

The present invention is described hereinafter particularly in the context of trucks and truck bodies. However, it is emphasised that the present invention is not limited to trucks and truck bodies.

In most mining and quarrying applications, the floors of truck bodies are constructed of flat plates welded into the main structures of the bodies. In some more recent truck bodies, the floor plates are curved and welded into the main structures of the bodies.

The plate floors are welded to the sides of the body and to supporting beams on the underside of the floor plates. The floor plates are generally made from high strength abrasion resistant steels.

Mining truck bodies are typically very large. Payload capacities in excess of 100 tonnes are common and in the largest trucks, payloads are greater than 350 tonnes. During truck loading operations, loads up to about 100 tonnes may be dropped several meters directly onto the floor of the truck body.

The material loaded into mining or quarrying trucks may vary widely in nature, even in the one mine. In one application it may be mostly large, hard, sharp cornered and very abrasive rocks. In another application the payload material may consist of smaller and softer rocks that are very abrasive. In yet another application, the payload may have a high proportion of cohesive material that sticks to parts of the body and does not shed fully from the body during load tipping operations. Typically, a mining truck body and particularly the floor must be able to handle wide variations in rock impact, abrasive wear (mainly during the load tipping/dumping operations) and cohesiveness of the material carried.

Mining trucks are typically expected to have a working life of at least 60,000 operating hours and during this time a single truck could experience about 300,000 load-haul-dump cycles.

The thickness of the steel truck body floors are typically in the range of 16 to 50 mm.

Thicknesses greater than about 25 mm are typically made up of a base plate and a high hardness wear resistant steel plate welded on top of the base plate. The top plate may be selectively placed rather than uniform over the whole area of the floor. Sometimes, spaced apart bars are used to reduce abrasive wear of the floor plate. Furthermore, numerous large supporting beams are required under these floor plates. These beams are required to prevent excessive bulging type permanent deformation of the floor when large rocks are dropped onto it.

Replacement or substantial repair of a truck body floor is typically required at least twice during the operating life of a mining truck. This repair work generally necessitates exchange of the truck body with a new or repaired body or that the truck spend a lengthy time in a workshop. The repair of truck body floors is a significant cost item for many mining trucks.

In an effort to overcome the problems and costs associated with floors made from flat steel plates, the use of suspended rubber floors in truck bodies has also become established in the mining industry. In this case, the floor consists of a single thick piece of rubber or a double thickness of rubber sheeting supported by numerous cables spanning between beams at the base of the side sections of the body. The cables are made of multiple strands of steel or elastomeric material. The cables act to carry the vertical forces from the load in the body via tension in the cables similar to the way the cables of a suspension bridge carry the loads from the road section of a "suspension bridge".

The main advantages of the suspended rubber floor are:
  Moist clay containing cohesive materials are less likely to stick to the body when it is tipped to dump the load.
  When worn out or badly damaged, the floor can be replaced relatively quickly.
  The empty weight of the body is sometimes less than for an all steel body of equivalent capacity.

The improved shedding of cohesive (sticky) materials mainly results from the flexing of the rubber floor during load tipping operations.

The disadvantages of the suspended rubber floor are:
  The initial purchase cost is higher than for an all-steel truck body.
  Frequent re-adjustment of the floor support cables is required (to adjust for permanent stretching that occurs).
  Intermittent and un-predictable replacement of failed or severely damaged cables is required.
  The rubber floor can be torn by large and sharp rocks.
  Replacement floors are expensive.

Because of the above difficulties, the applicant believes that the use of suspended rubber floors has been limited to less than 10% of all mining applications. Their use is mainly restricted to applications where the improved shedding of sticky materials is very important and/or where the elimination of supplementary wear resistant steel plating on the floor of the body is highly beneficial.

Analytical modelling work and mine site trials have shown that an alternative to the above-described floors is suspended curved metal (typically steel and hereinafter described in that context) truck body floors.

In any given application, a curved steel plate is supported only at the two sides of a truck body so that it curves down from and is suspended between the supporting points at the sides.

The suspended curved steel floor plate provides the general load containing function and acts as a tension member to transfer the vertical forces from the load on the floor to tension forces which are transferred into a support frame of the truck body. The support frame comprises beams at the base of the sides of the body. Because the suspended curved steel floor plate carries the forces arising from the payload primarily through tension forces within the plate, it has sometimes been referred to as a steel membrane floor. However, in practice the bending stiffness of the plate (arising from the thickness required to provide a long life against abrasive wear), the high variability in the placement of the loads carried, and in some cases, eccentricity of the load transfer points on the edges of the floor, means that the suspended curved steel floor plate is also subjected to moderate bending loads. Unless it is severely overloaded, the suspended curved steel floor plate experiences only small changes from its initial shape.

Several edge-supported curved steel plate floors have performed successfully in extended mine site trials during 1996 and 1997. These floor systems were for a large rear dump mining truck with a rated payload capacity of approximately 180 tonnes.

The applicant has invented a system that attaches a curved metal plate floor to a load carrying body of a vehicle, such as a truck or rail wagon. The system is described and claimed in Australian patent 2006228988 in the name of the applicant and the disclosure in the patent specification of the patent is incorporated herein by cross-reference. The system includes a series of tensile members that are connected directly or indirectly at opposite ends to (a) the floor plate and (b) the body of the vehicle and these tensile members are at least the principal means for transfer of forces from the floor plate to the body. The patent describes a particular form of the tensile members.

The above description is not to be taken to be an admission of the common general knowledge in Australia or elsewhere.

SUMMARY OF INVENTION

However, to date edge-supported curved steel plate floors have not been commercially adopted for mining truck or other applications. The applicant believes that the main reasons for non-adoption of this technology are:

The cost of manufacturing the attachment system between the floor plate and the support frame of the body.

The difficulty of achieving a good uniform contact between the abutment bar on the floor plate and the mating bar on the frame when replacement of the floor plate is required.

Uncertainty about the ability of this floor to shed sticky materials.

The floor attachment system of the present invention:

Provides for easy installation and replacement of the floor.

Allows for geometric variations between similar bodies.

Provides more uniform transference of loads from the floor to the structure of the body.

Allows for varying the flexibility of the floor by design.

The floor attachment system of the present invention is particularly suited to applications where;

The truck body floors are subject to high impact loads during the truck loading operations.

The truck body floors are subject to high abrasive wear conditions.

Replacement or supplementary plating of the floor is required at least once during the operating life of the truck.

The above conditions typically arise in many applications of trucks used in the mining and quarrying industries. They also arise in other applications.

In general terms, the present invention provides an alternative system that attaches a curved metal plate floor to a load carrying body of a vehicle, such as a truck or rail wagon.

More particularly, the present invention provides a load carrying body for a vehicle, and the load carrying body includes a curved metal plate floor and a floor attachment system that attaches the floor to opposite sides of the body so that the floor is suspended between the sides, and the floor attachment system includes a plurality of tensile members, each of which is coupled at one end to one of the sides of the body of the vehicle and at the other end to a side edge of the floor, with each tensile member having a coupling element that is retained within (a) a recess in the edge of the floor or (b) an opening that extends through the floor from an upper surface to a lower surface of the floor, with the tensile members being at least the principal means for transferring forces from the floor to the remainder of the body.

The term "tensile members" in the context of the present invention is understood to mean members that allow movement of the floor relative to the remainder of the vehicle body by a mechanism of tension loading and unloading of the members. This is a different mechanism to that which operates where there is rigid clamping that prevents any movement between the edges of the floor and the adjacent parts of the vehicle body.

The term "principal means" in the above reference to "the tensile members being at least the principal means for transferring forces from the floor to the remainder of the body" is understood herein to mean that, whilst there may be other elements that transfer forces from the floor to the remainder of the body, the tensile members are intended to provide at least 60%, typically at least 70%, preferably at least 80%, and more preferably all, of the force transfer between the floor and the remainder of the body.

The coupling element and the recess/opening may be formed to allow swiveling movement of the coupling element in the recess/opening to accommodate misalignment of the floor and the body in two mutually perpendicular directions that can occur as a consequence of varying the load on the floor and/or manufacturing variations in alignment. The resultant swiveling movement of the coupling element relative to the floor in the two mutually perpendicular directions meets two important requirements. One requirement is to accommodate geometry changes as a consequence of varying loads on the floor. Another consequence is to accommodate changes of alignment during manufacture. By way of example, these manufacturing alignment issues may be a result of variations in manufacturing dimensions or overlapping of adjoining plates making up a floor.

The coupling element and the recess/opening may be formed to accommodate misalignment of the floor and the body in two mutually perpendicular directions that can occur as a consequence of varying the load on the floor and/or manufacturing variations in alignment.

The coupling element and the recess/opening may be formed to accommodate misalignment of the floor and the body in a direction that is perpendicular to the plane of the floor at the side edge of the floor that can occur as a consequence of varying the load on the floor and/or manufacturing variations in alignment.

The coupling element and the recess/opening may be formed to accommodate longitudinal misalignment of the floor and the body that can occur as a consequence of varying the load on the floor and/or manufacturing variations in alignment.

Each side of the body may include a longitudinal beam and the coupling element and the recess/opening may be formed to accommodate longitudinal misalignment of the floor and the longitudinal beams of the body that can occur as a consequence of varying the load on the floor and/or manufacturing variations in alignment.

The terms "longitudinal misalignment of the floor and the body" and "longitudinal misalignment of the floor and the longitudinal beams of the body" are understood herein to mean misalignment in a forward-rearward direction of the body.

The tensile member may comprise an elongate element.

The coupling element and the elongate element may be integrally formed.

The coupling element and the elongate element may be separate elements that can be coupled together.

The coupling element may be a formation, such as a nut, that is received in and retained within the recess in the edge of the floor.

The coupling element may include top and bottom flanges that locate the element in relation to top and bottom surfaces of the floor and retain the element in the recess.

The coupling element may include at least one abutment surface that is adapted to engage a corresponding abutment surface of the floor and allow swiveling movement of the coupling element in the recess.

The abutment surface may be curved about two mutually perpendicular axes.

The recess may be in the form of a notch.

The recess may be in the form of a cut-out section.

The cut-out section may be a key-hole shape.

The coupling element may be a clevis and clevis pin assembly, with the clevis pin extending through the opening in the floor.

The openings may be at least 1 mm inboard of the closer side edge of the floor.

The tensile members may be releasably coupled to one or both of the body and the floor to allow replacement of the floor.

The tensile members may be releasably coupled to one or both of the longitudinal beams of the body and the floor to allow replacement of the floor.

The tensile members may have an adjustable-length.

The tensile members may apply a tension load to the floor plate at or close to a centre-line of the thickness of the plate. The tensile members may apply a tension load to the floor plate along a line of action that is within 10% of the thickness of the floor plate relative to the centre-line of the thickness of the plate.

The tensile members, and typically the tensile elements, may have an unsupported length that is significantly greater than their diameter. For example, the unsupported length may be at least 2 times, typically at least 4 times and more typically at least 6 times the diameter of the member. The long unsupported length allows flexure of the tensile members to help accommodate any changes of alignment that may occur and it also reduces the angle of swiveling required at both ends of the tensile members. Another advantage is that it also adds to the flexibility of the floor system. A long unsupported length of the tensile members also increases the vertical movement of the floor plate as the vertical loading on the floor plate changes. Increased vertical movement of the floor plate assists with freeing of sticky materials that would otherwise accumulate around the corners of the load carrying body.

The present invention also provides a vehicle that includes the above-described load carrying body having a curved metal plate floor and a floor attachment system that attaches the floor to the remainder of the body.

The floor may comprise a plurality of the above-described recesses at spaced intervals along the side edges of the floor.

The floor may comprise a plurality of the above-described openings that extend through the floor from the upper surface to the lower surface of the floor at spaced intervals along the side edges of the floor.

The openings may be at least 1 mm inboard of the closer side edge of the floor.

The present invention also provides a curved metal plate floor that includes a plurality of the above-described recesses at spaced intervals along the side edges of the floor.

The present invention also provides a curved metal plate floor that includes a plurality of the above-described openings that extend through the floor from the upper surface to the lower surface of the floor at spaced intervals along the side edges of the floor.

The openings may be at least 1 mm inboard of the closer side edge of the floor.

Some of the advantages of the invention are:

There are no separate welded-on abutment or anchorage plates on the curved metal floor.

Lower manufacturing costs.

Can use higher hardness (more wear resistant) floor plates in some applications (due to no welding requirement).

The forces from the tensile members act on or very close to the centre-line of the plate thickness.

Thinner floors become possible in some applications (due to negligible bending moments induced by the tensile members and the elimination of welds that would require lower operating stress levels).

The system can work with the line of action of the tensile member significantly off perpendicular to the edge of the floor (in both the vertical and longitudinal directions).

Allows the use of overlapping floor segments (rather than butt welding the segments together)—with a linear arrangement for the outer ends of the tensile members.

Allows changing the radius of curvature of the floor across the length of a floor segment (to make a partial conical section).

BRIEF DESCRIPTION OF THE DRAWINGS

The present invention is described further by way of example with reference to the accompanying drawings, of which:

FIG. 7 is a partial top plan view of the floor of the body that shows the shape of the recesses in the side edges of the floor that forms part of the floor attachment system of the truck body shown in FIGS. 2 to 4;

FIG. 8 is a detailed view of the region described by circle "C" in FIG. 7;

FIG. 20 illustrates how the coupling element shown in FIGS. 18 and 19 can provide articulation in both the longitudinal direction and the upward/downward direction relative to the edge of the floor of the truck body shown in FIGS. 2 to 4.

DETAILED DESCRIPTION

The following description of the present invention is in the context of trucks and truck bodies. As noted above, the present invention extends to any type of vehicle.

Figure 1:
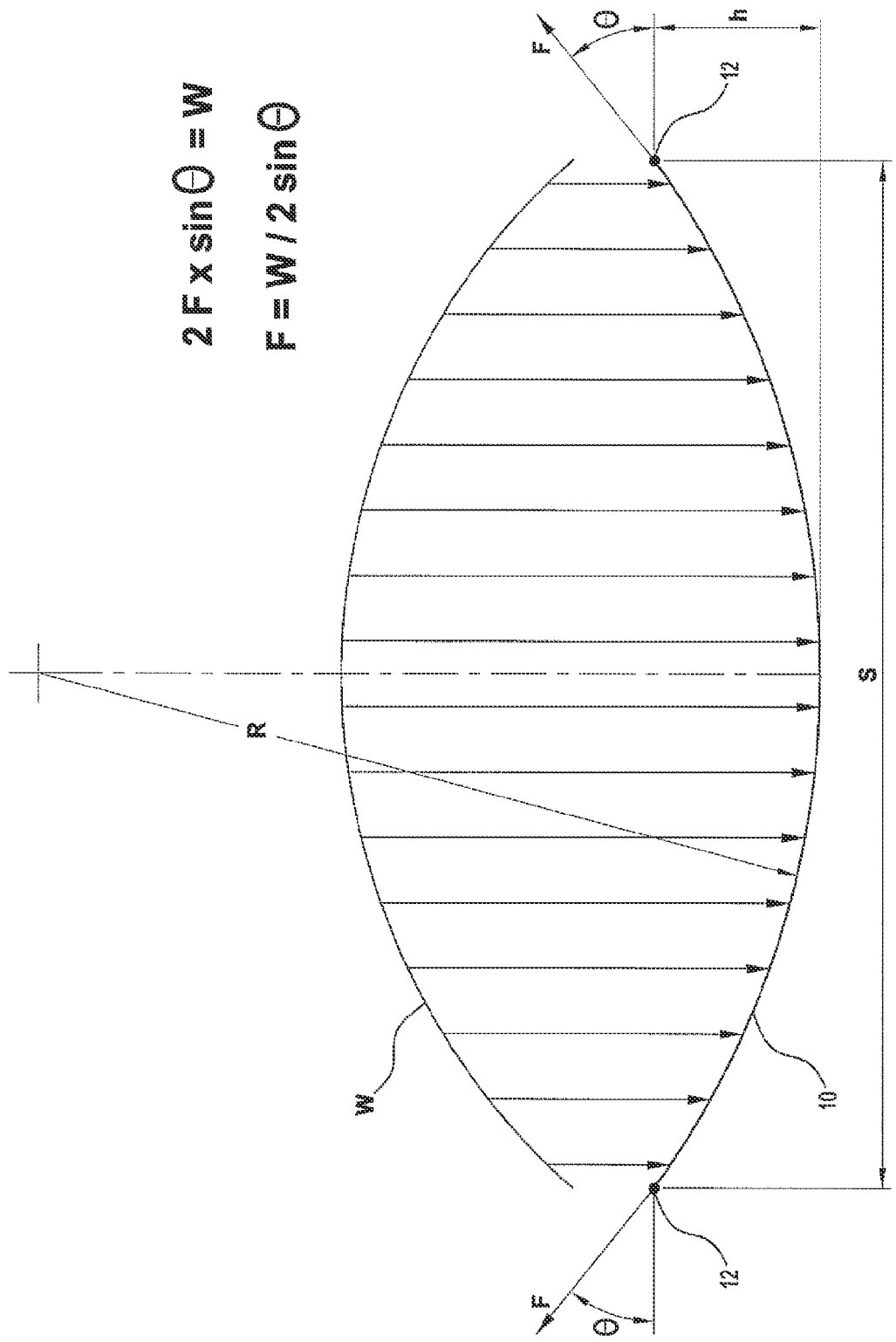
FIG. 1 shows the principle of the edge-supported curved metal plate floor, as described above.

FIG. 1 shows the principle of an edge-supported curved steel plate floor 10 of a truck body. The floor 10 shown in the Figure, which is typically 12-50 mm thick and 4-10 tonnes in weight, is rolled to a constant or varying radius R. The floor 10 is supported at the side edges 12 of the floor 10 only. The edge forces F that are generated by the floor 10 act tangentially to the edges of the floor 10. Because of the curvature of the floor 10, the tangent line is at an angle (θ) above the horizontal. The vertical component of the tangential forces (F×sin θ) balances the weight of the floor 10 plus the weight of the payload (W) carried by the floor 10.

In most applications and particularly in mining truck applications, it is desirable to have the largest practical radius of curvature for the floor plate so that the centre of gravity for the payload is as low as possible because increasing the height of the centre of gravity for the payload reduces the stability of the truck and increases the stresses on many of the truck components during cornering, braking etc.

The edge-supported curved steel plate floor 10 provides the potential for:

A lower empty truck weight without increasing the manufacturing cost for the truck.

Rapid, low cost replacement of the truck body floor.

Improved shedding of cohesive (sticky) materials compared to the conventional rigid all steel bodies.

Figure 2:
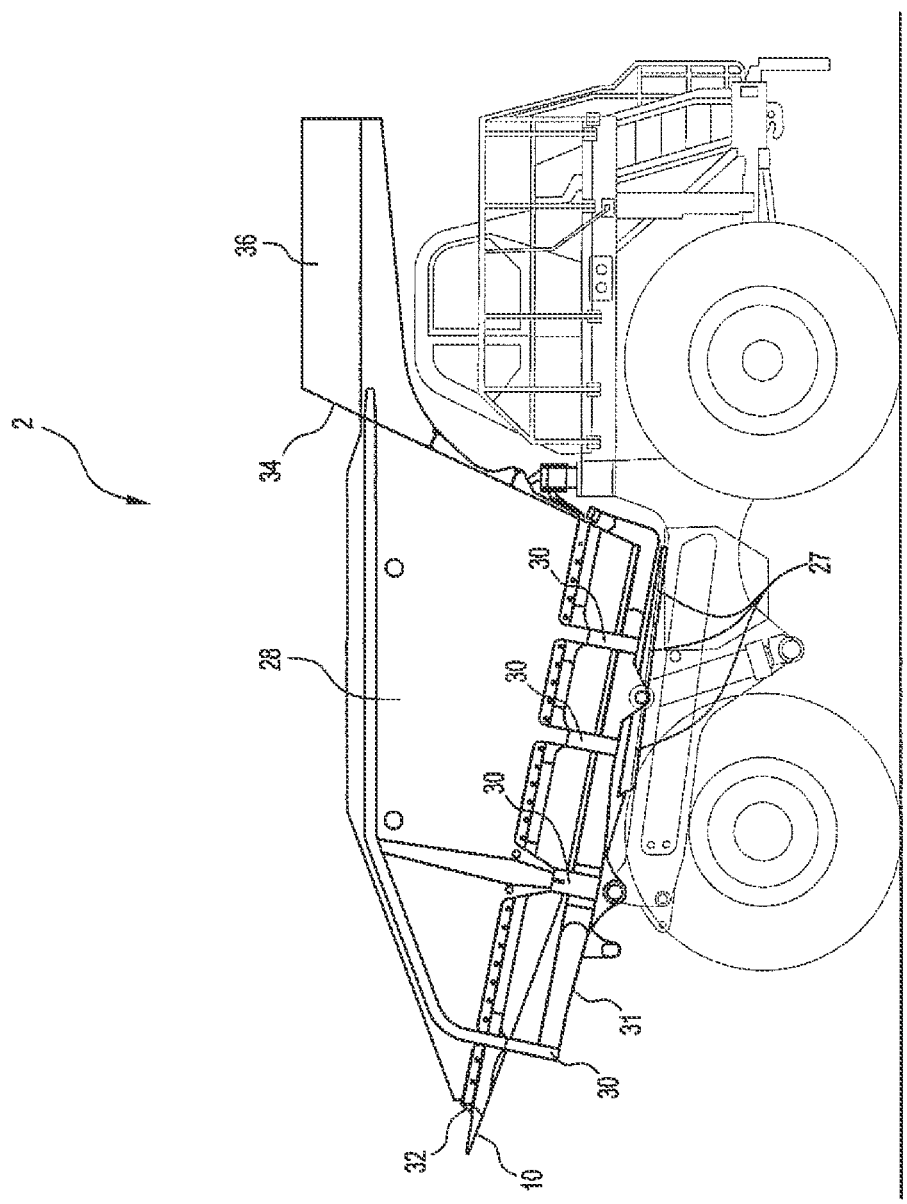
FIG. 2 is a side elevation of a truck having a truck body in a carry position, with the truck body including one embodiment of a system for attaching the curved metal plate floor of the body to the remainder of the body in accordance with the present invention.
Figure 3:
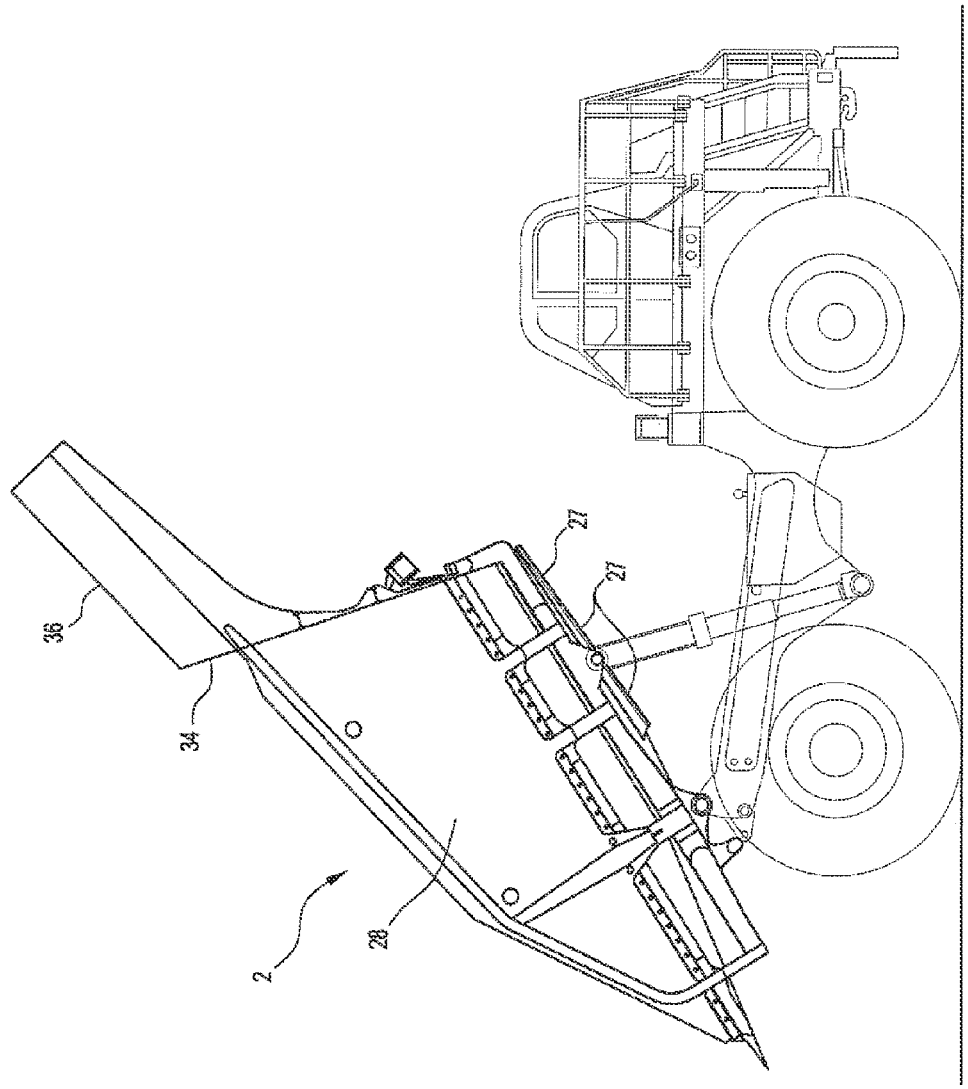
FIG. 3 is a side elevation of the truck shown in FIG. 2 with the truck body in an unload position.

The truck shown in FIGS. 2 and 3 is suitable for use for hauling mined ore and waste materials in open-pit mines. The mined ore may be any type of ore, such as iron ore and coal.

The truck includes a wheel-mounted chassis, a cabin, and a truck body, generally identified by the numeral 2 for containing mined material. The body 2 has opposed sides, a front end, and a rear end. The body 2 is supported on the truck chassis for pivoting movement between the carry and unloading positions shown in FIGS. 2 and 3 respectively. The present invention is not confined to the particular configuration of the truck shown in FIGS. 2 and 3.

The body 2 includes an array of transverse beams 30 and longitudinal beams 31 and 32 that are welded together and define a support frame for the body 2. The inner pair of longitudinal beams 31 transfers the loads from the body 2 to the chassis of the truck via pivot couplings on the beams and the chassis and via support pads 27 between the body and the chassis of the truck.

The body 2 also includes side walls 28 that extend upwardly from the outermost longitudinal beams 32, a front wall 34, and a canopy 36. The side walls 28, the front wall 34 and the canopy 36 are made from plate steel.

The body 2 also includes a curved metal plate floor 10 that is suspended between the opposite sides of the body 2.

Figure 4:
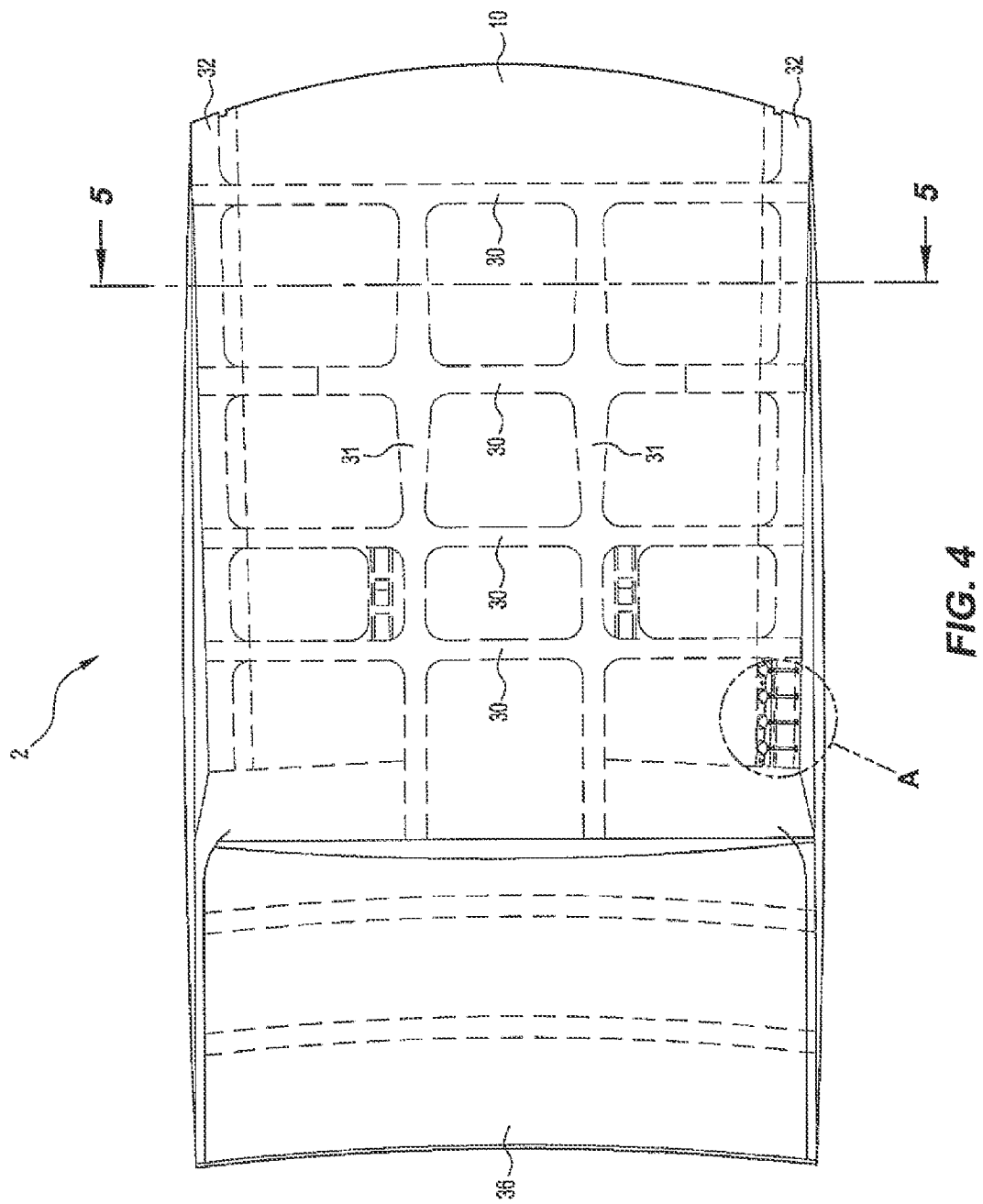
FIG. 4 is a top plan view of the truck body of the truck shown in FIGS. 2 and 3.
Figure 5:
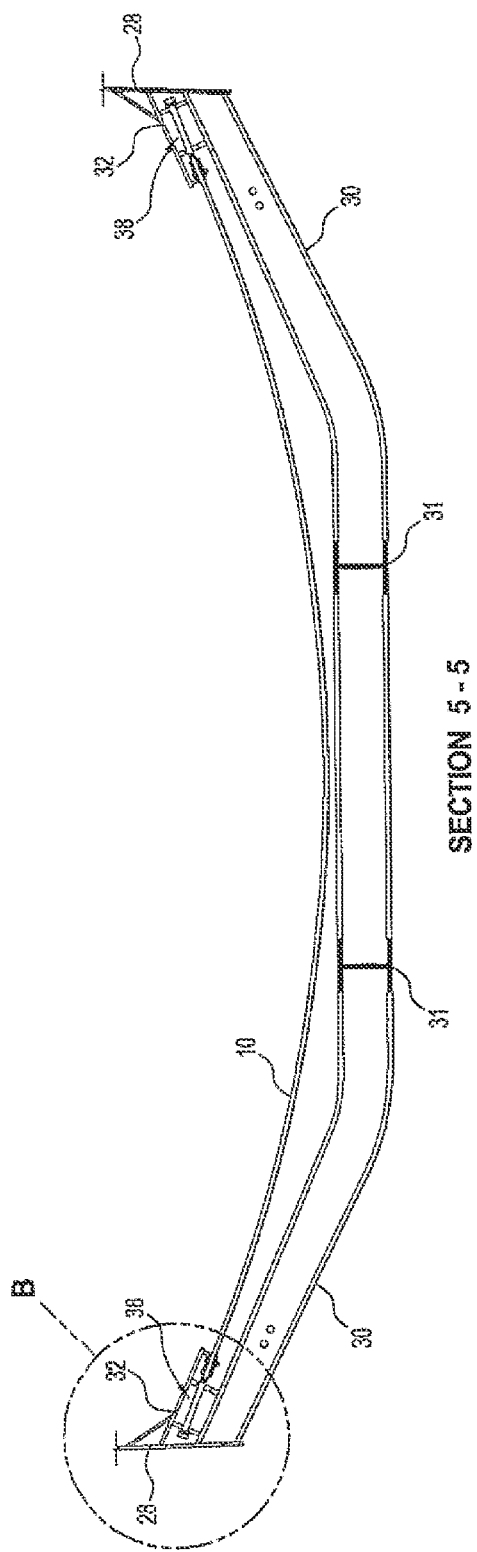
FIG. 5 is a cross-section along the line 5-5 of FIG. 4, with the figure showing the floor attachment system and the arrangement of the beam structure that supports the floor of the truck body shown in FIGS. 2 to 4.
Figure 6:
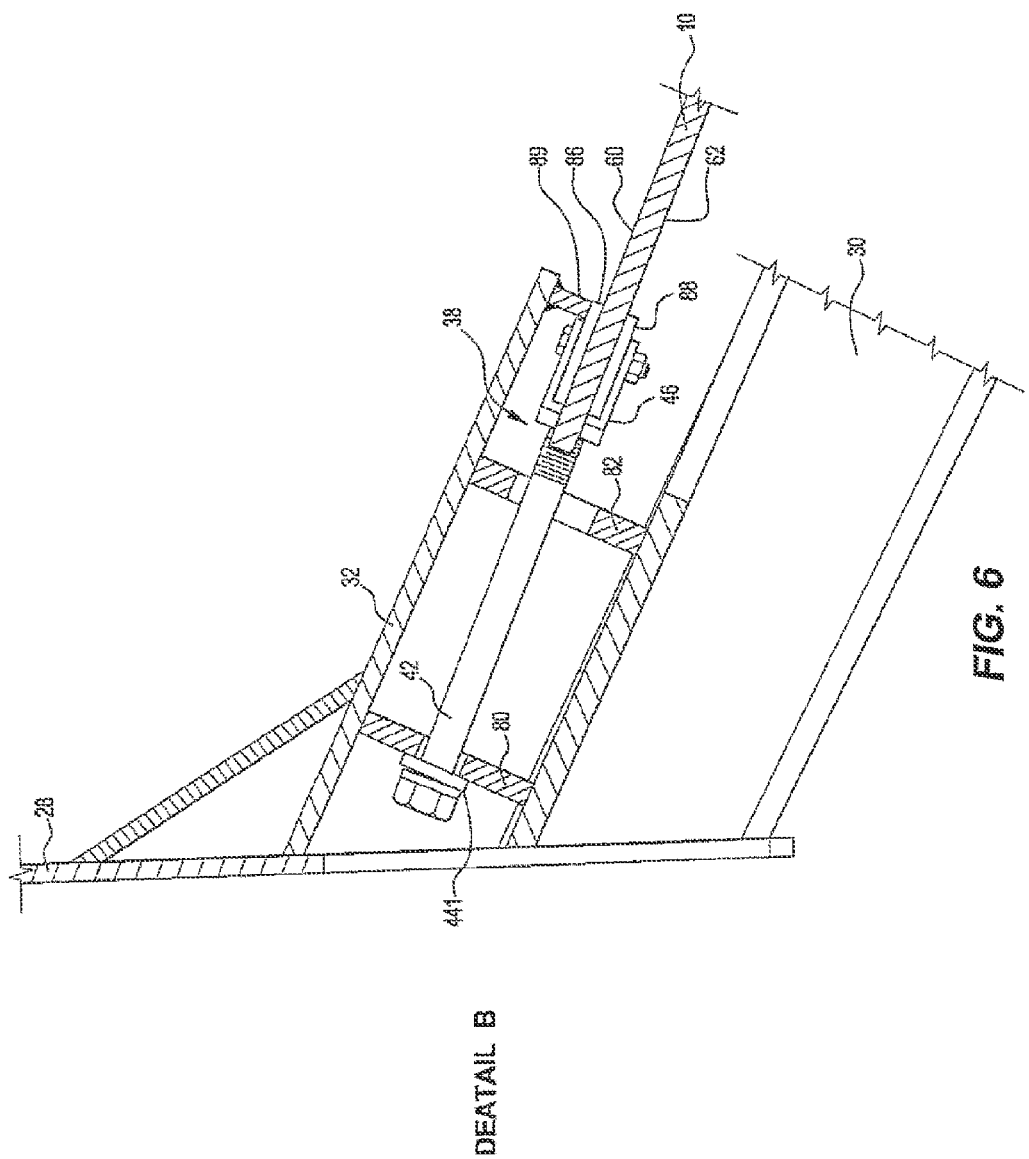
FIG. 6 is a detailed view of the region described by the circle marked "B" in FIG. 5, with the figure showing the floor attachment system of the truck body shown in FIGS. 2 to 4.
Figure 9:
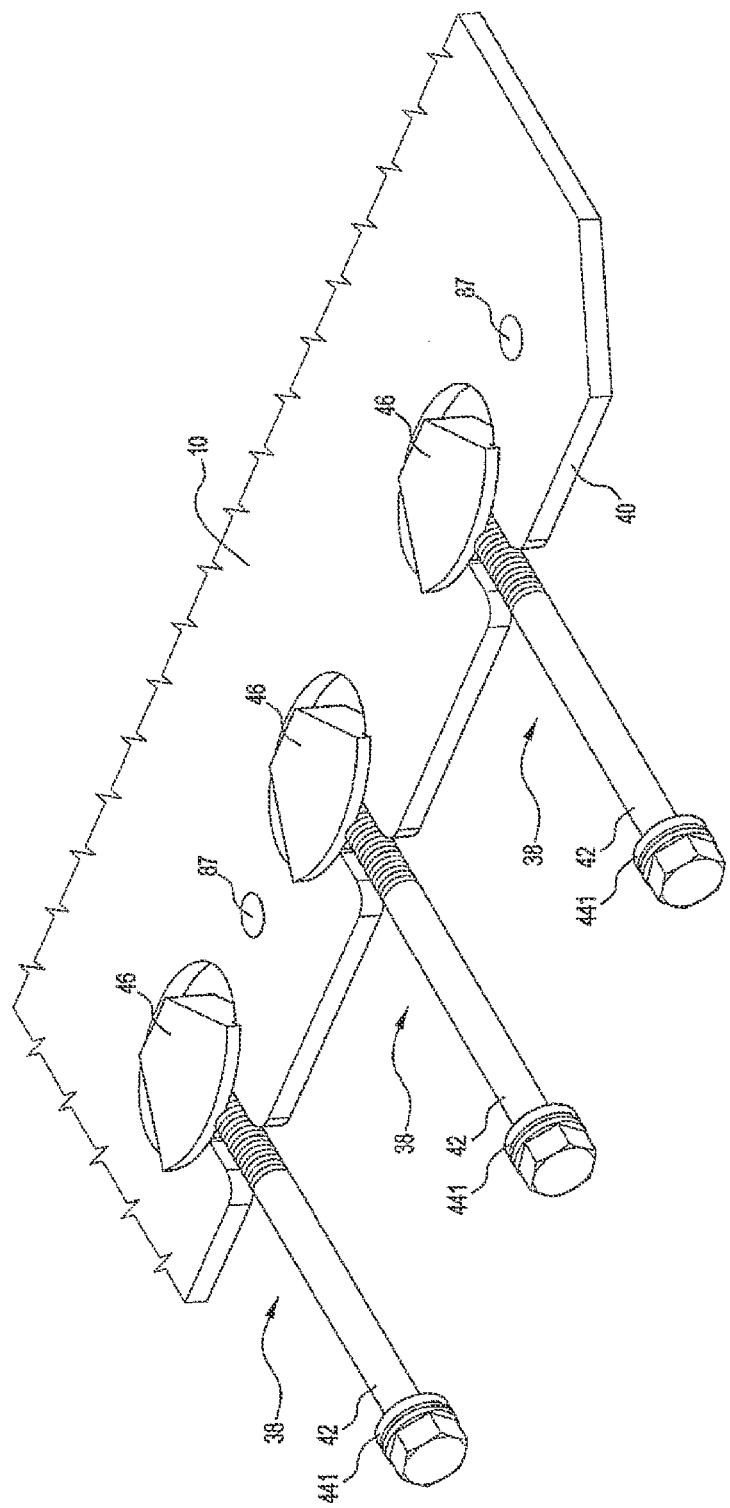
FIG. 9 is a partial perspective view from above that illustrates in a simplified form the floor attachment system of the truck body shown in FIGS. 2 to 4.
Figure 10:
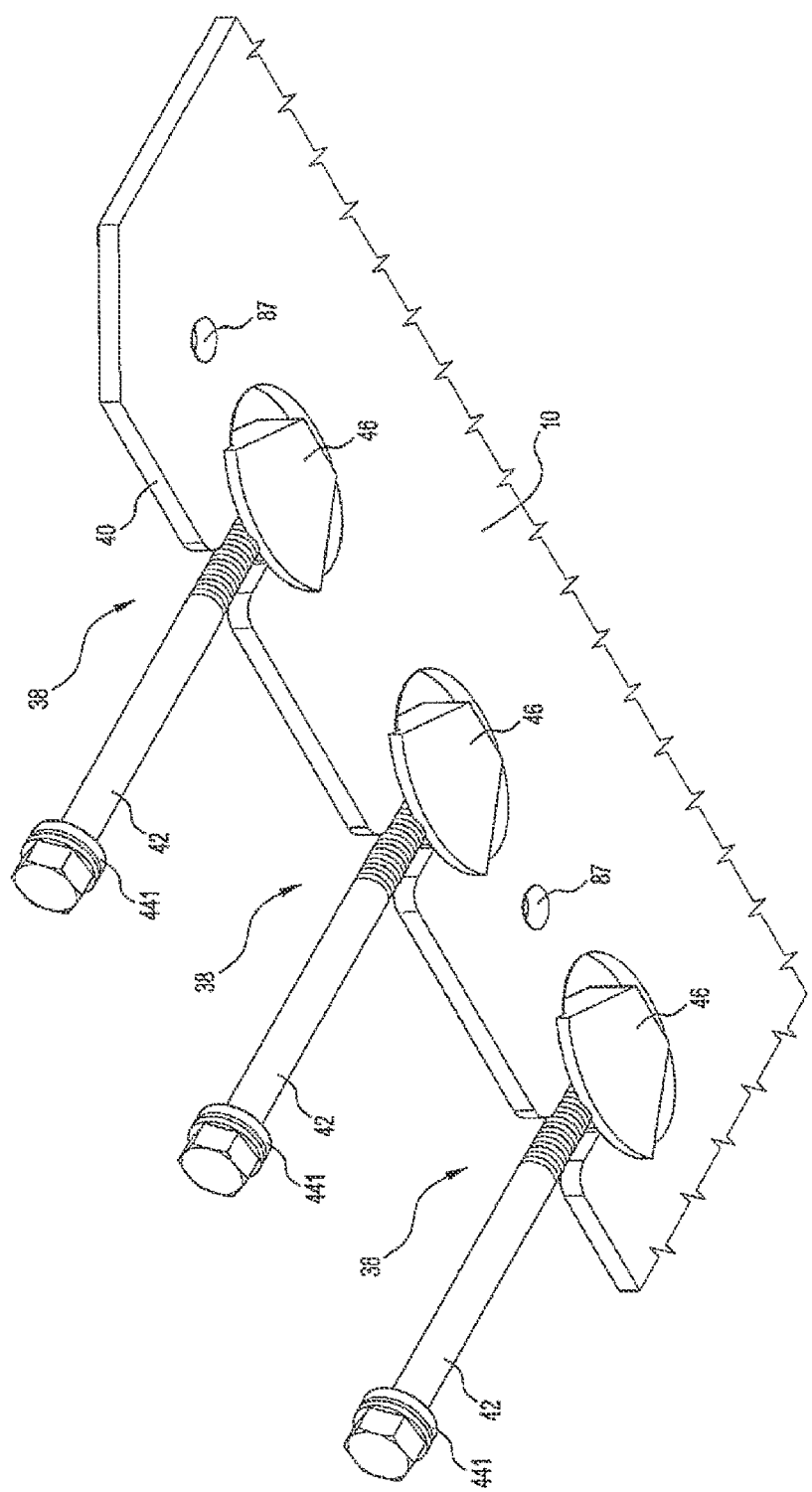
FIG. 10 is a partial perspective view from below that illustrates in a simplified form the floor attachment system of the truck body shown in FIGS. 2 to 4.
Figure 11:
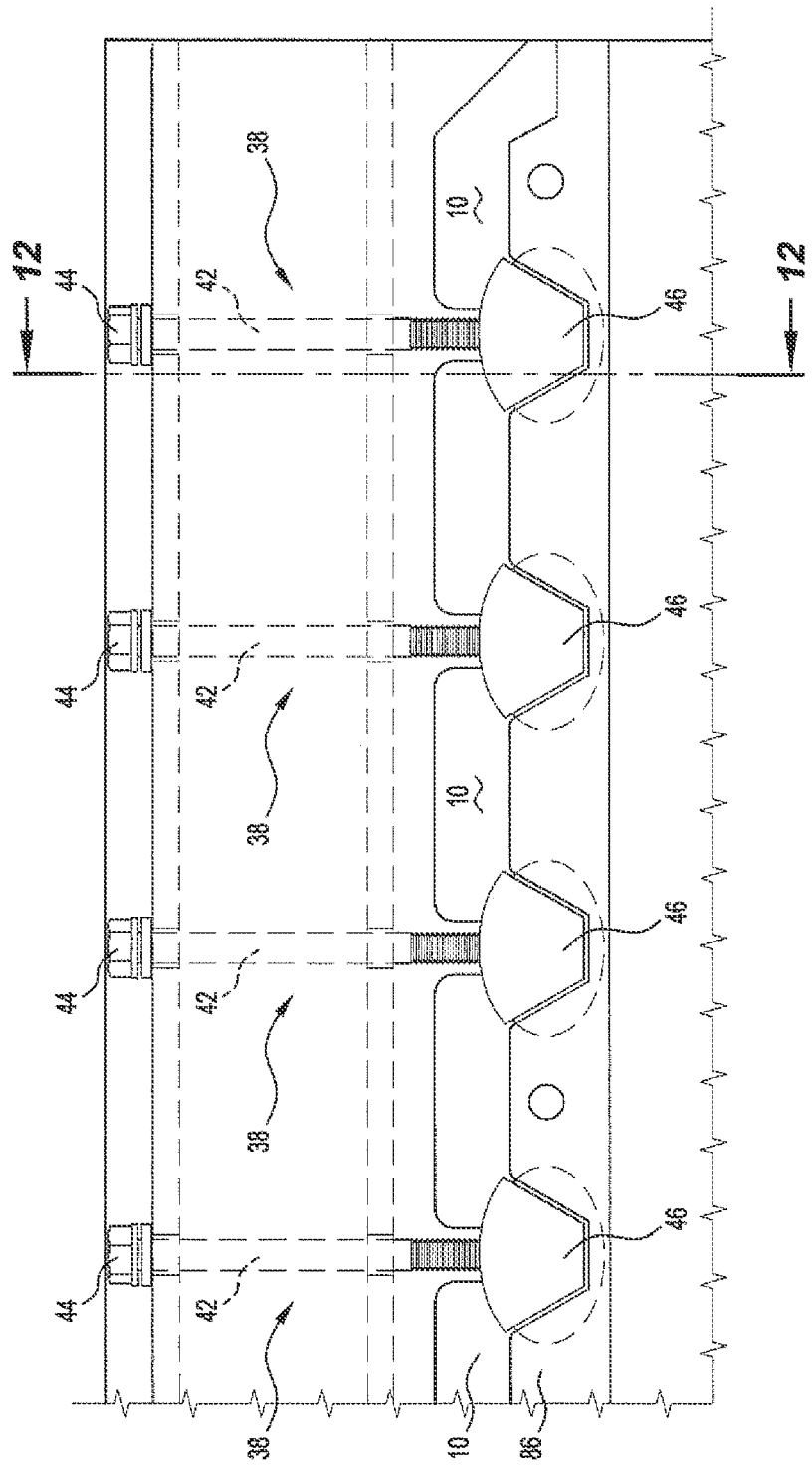
FIG. 11 is a detailed view of the region described by the circle marked "A" in FIG. 4, with the figure showing the floor attachment system of the truck body shown in FIGS. 2 to 4.

The body 2 also includes one embodiment of an attachment system for the curved metal plate floor 10 in accordance with the present invention. The system couples the floor 10 to the outermost longitudinal beams 32 of the body 2 and thereby suspends the floor 10 between the sides of the body 2. The arrangement of the transverse and longitudinal beams is shown in more detail in FIGS. 4 and 5. The attachment of the floor 10 to the outermost longitudinal beams 32 is shown in FIGS. 5 and 6. The floor 10 is made from steel plate that has been rolled or otherwise formed to have a prescribed radius R. This radius may be constant or varying across the width of the floor 10. The radius R may also vary along the length of the floor. The floor 10 includes a top surface 60 and a bottom surface 62. The floor 10 includes a plurality of recesses 48 at spaced intervals along side edges 40 of the floor 10 (FIGS. 7 and 9 to 11).

As is described in more detail below, the recesses 48 form part of one embodiment of a floor attachment system in accordance with the present invention.

With particular reference to FIGS. 7 and 8, each recess 48 is in the form of a key-hole that has a first throat section 50 that extends inwardly from a side edge 40 of the floor 10 and a larger main section 52. The main section 52 is defined in part by a pair of abutment surfaces 56 of the floor 10 that extend outwardly from the throat section 50 and inwardly from the side edge 40 and define a curved surface—which is a concave surface as viewed from within the main section 52. The abutment surfaces 56 are approximately perpendicular to the top and bottom surfaces 60, 62—see FIG. 13.

With reference to FIGS. 6 and 9 to 11, the embodiment of the floor attachment system shown in these figures also includes a series of tensile members generally identified by the numeral 38 that are coupled at one end to the outermost longitudinal beams 32 and at the other end to a side edge 40 of the floor 10, with the tensile members being at least the principal means for transferring forces from the floor to the body. The tensile members 38 apply a tension load to the floor 10 at or near to a centre-line of the thickness of the floor 10 between the top and bottom surfaces 60, 62 of the floor 10.

Each tensile member 38 comprises (a) an elongate element 42 in the form of a bolt having a head 44 at one end and a thread at the other end and (b) a separate coupling element 46 in the form of a nut with a threaded hole 76 that can receive the threaded end of the elongate element 42.

The coupling element 46 is formed so that it can be retained within the main section 52 of the recess 48 in the side edge 40 of the floor 10.

The coupling element 46 and the recess 48 are formed to accommodate misalignment of the floor 10 and the body 2 in two mutually perpendicular directions that can occur as a consequence of varying the load on the floor 10 and/or manufacturing alignment. One direction is a direction perpendicular to the plane of the floor 10 at the side edges 40 of the floor 10 and the other direction is a longitudinal direction of the body 2. The top surface 60 or the bottom surface 62 of the floor 10 at the side edges 40 of the floor 10 are understood herein to be the plane of the floor 10. Misalignment in the direction perpendicular to the plane of the floor 10 is provided by the radius 141 on the abutment surfaces 74 on the coupling element 46 rolling in the vertical direction on the corresponding surface in the recesses 48 in the floor 10. Misalignment in the longitudinal direction of the body 2 is provided by rotational sliding between the radius 143 on the coupling element 46 and the radius 56 of the abutment surfaces in the recess 48 in the floor 10.

Figure 12:
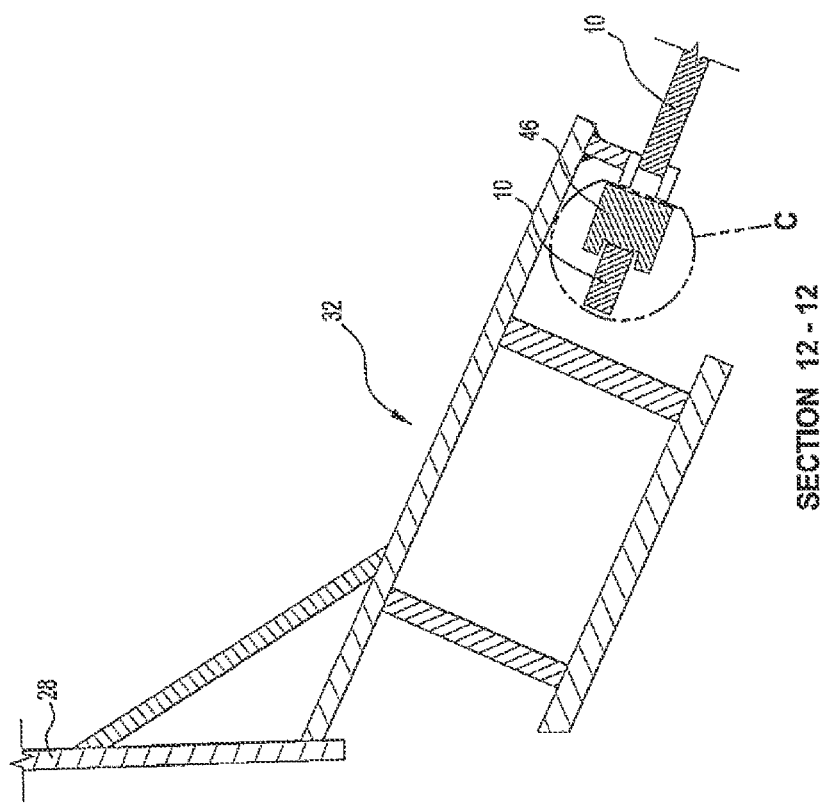
FIG. 12 is a cross-section view along line 12-12 in FIG. 11.

With particular reference to FIGS. 5, 6 and 12, each outermost longitudinal beam 32 is a hollow box section that has aligned openings in the outer and inner side walls 80, 82 respectively of the beam. Each tensile member 38 can be positioned so that the elongate element 42 extends through the openings, with the head 44 engaging the wall 80 via a swiveling type washer assembly 441.

Figure 13:
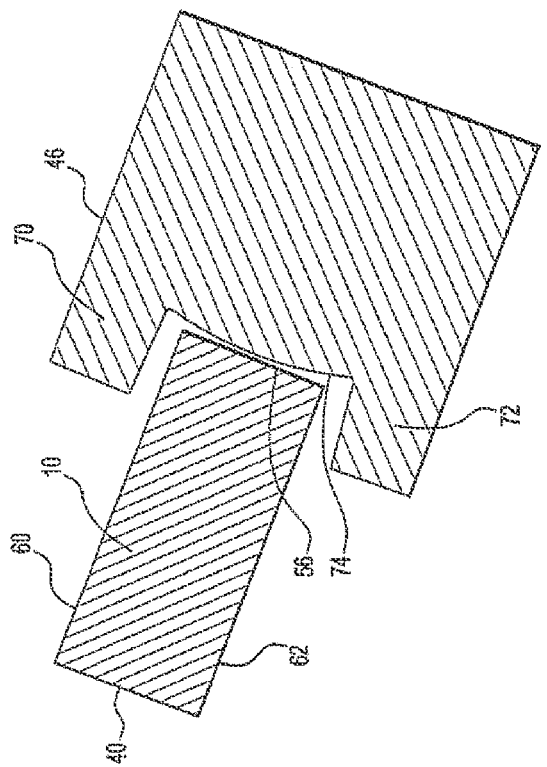
FIG. 13 is a detailed view of the region described by the circle "C" in FIG. 12.
Figure 14:
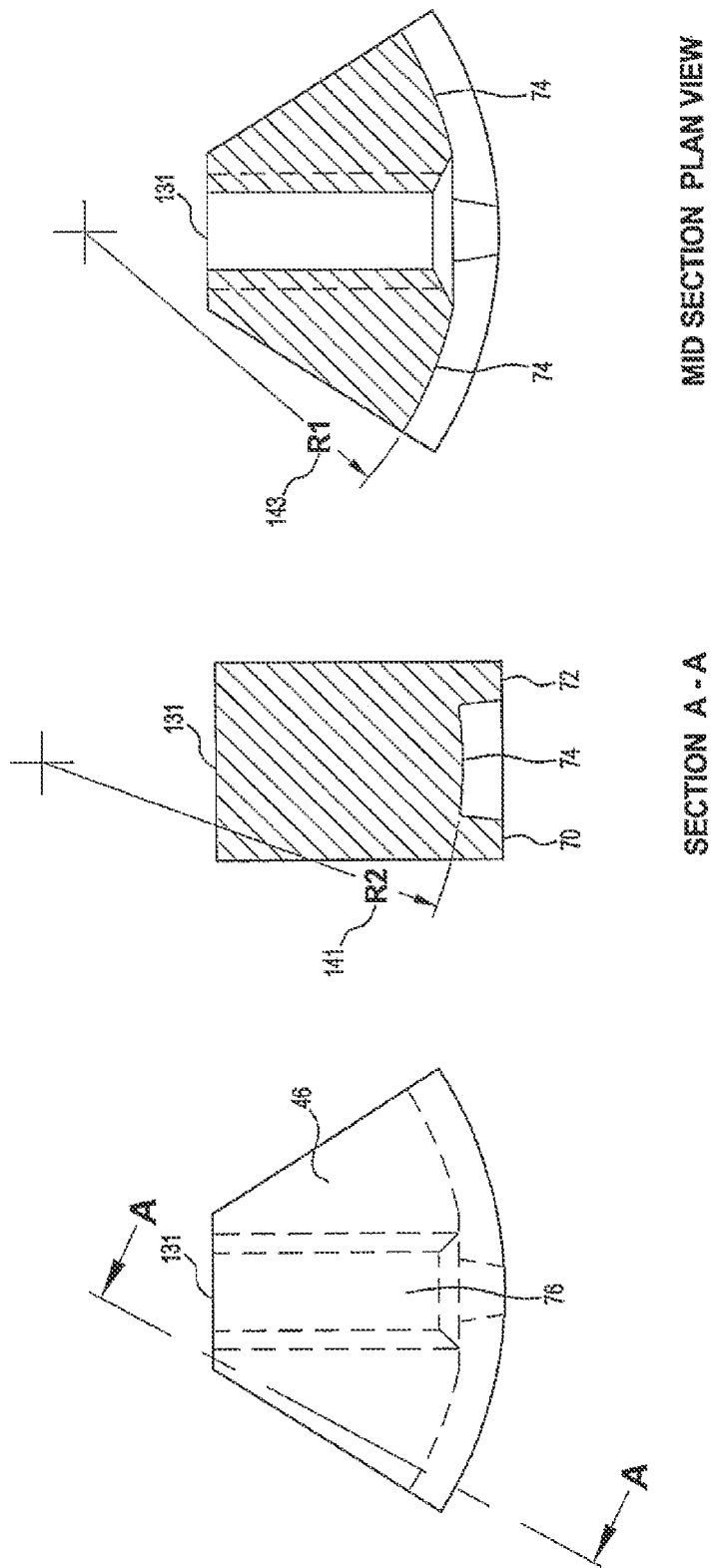
FIG. 14 provides three views of the coupling element that forms part of the floor attachment system of the truck body shown in FIGS. 2 to 4.

With particular reference to FIGS. 13 and 14, each coupling element 46 has a pair of top and bottom flanges 70, 72 that locate the coupling element 46 in relation to the top and bottom surfaces 60, 62 of the floor 10 and retain the coupling element in the recess 48. Each coupling element 46 also includes a pair of abutment surfaces 74 (FIG. 14) between the flanges 70, 72. The abutment surfaces 74 engage the abutment surfaces 56 of the floor 10. The abutment surfaces 74 are curved surfaces, with the curves extending outwardly and rearwardly in relation to the internally threaded hole 76 in the coupling element 46. The abutment surfaces 74 are also convex between the top and bottom flanges 70, 72 of the coupling element 46—see FIG. 14. Hence, each abutment surface 74 of the coupling element 46 is curved about two mutually perpendicular axes.

The curved surfaces of the abutment surfaces 56 of the floor 10 and the abutment surfaces 74 of the coupling elements 46 can accommodate limited relative changes of alignment between the coupling elements 46 and the floor 10 in two directions. This movement can be described as swiveling movement. This swiveling movement allows limited movement of the floor 10 relative to the remainder of the body 2 in two directions without imposing unacceptable bending on the elongate elements 42. In the context of a truck body 2 located on a truck in a carry position, one of these directions can be described as a forward/rearward (i.e. longitudinal) direction and the other direction can be described as an upward/downward direction.

Figure 15:
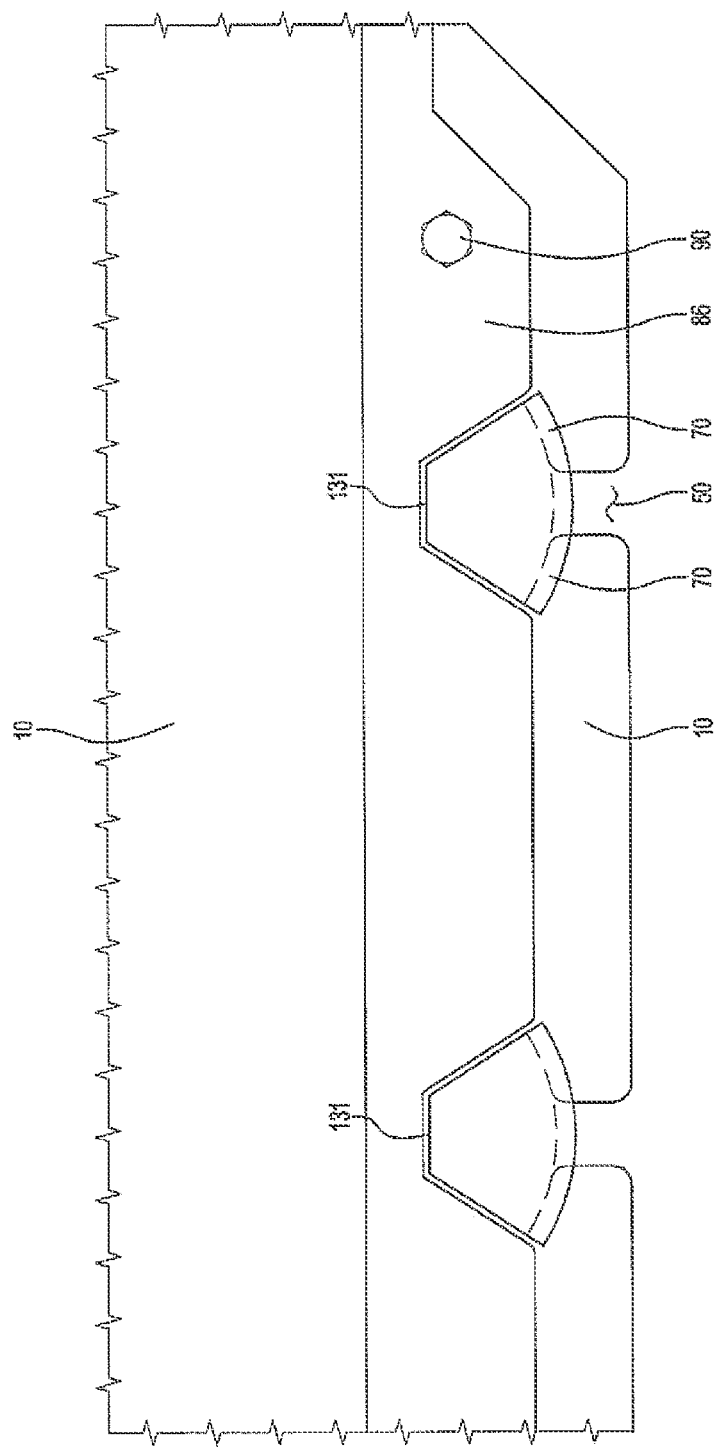
FIG. 15 is a partial view from above that shows the upper part of the system for retaining the coupling elements of the floor attachment system of the truck body shown in FIGS. 2 to 4.
Figure 16:
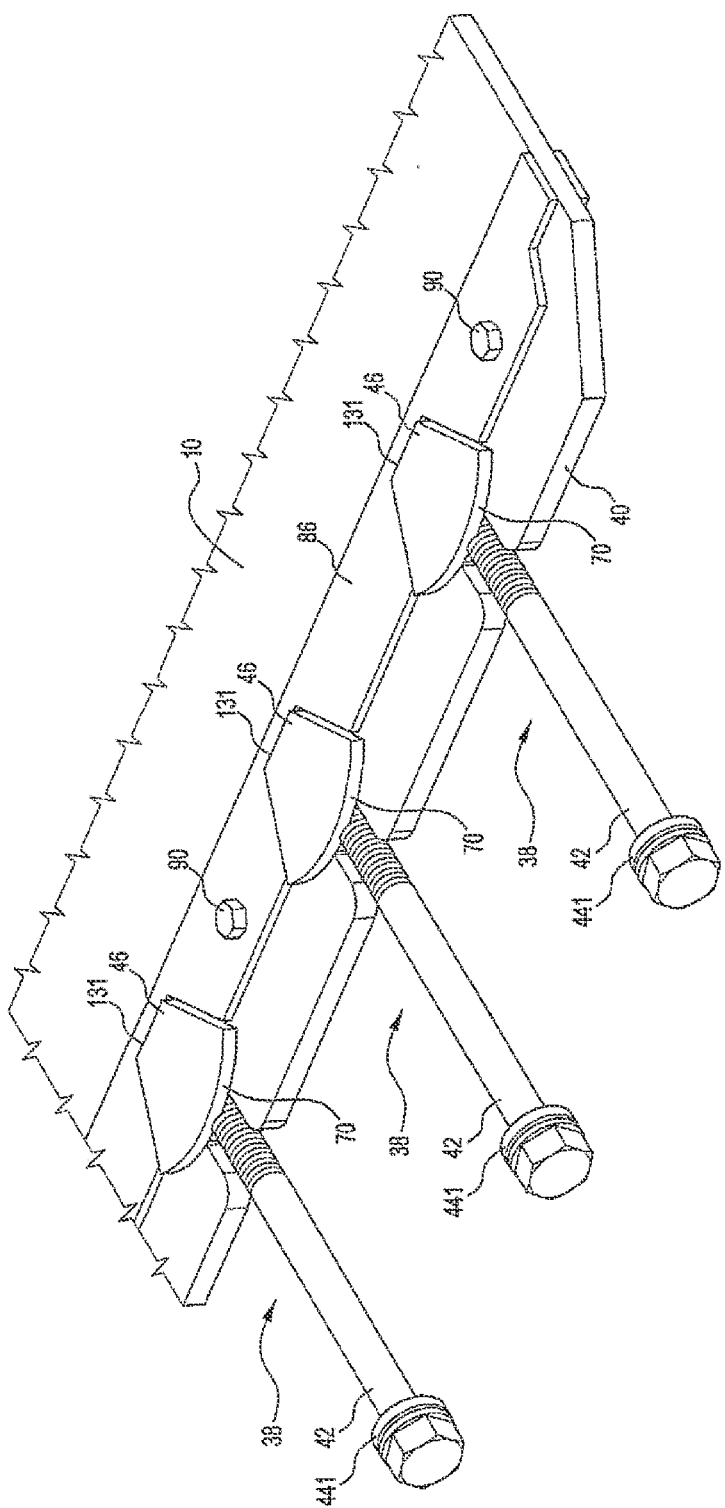
FIG. 16 is a partial perspective view from above that shows more completely the upper part of the system for retaining the coupling elements of the floor attachment system of the truck body shown in FIGS. 2 to 4.
Figure 17:
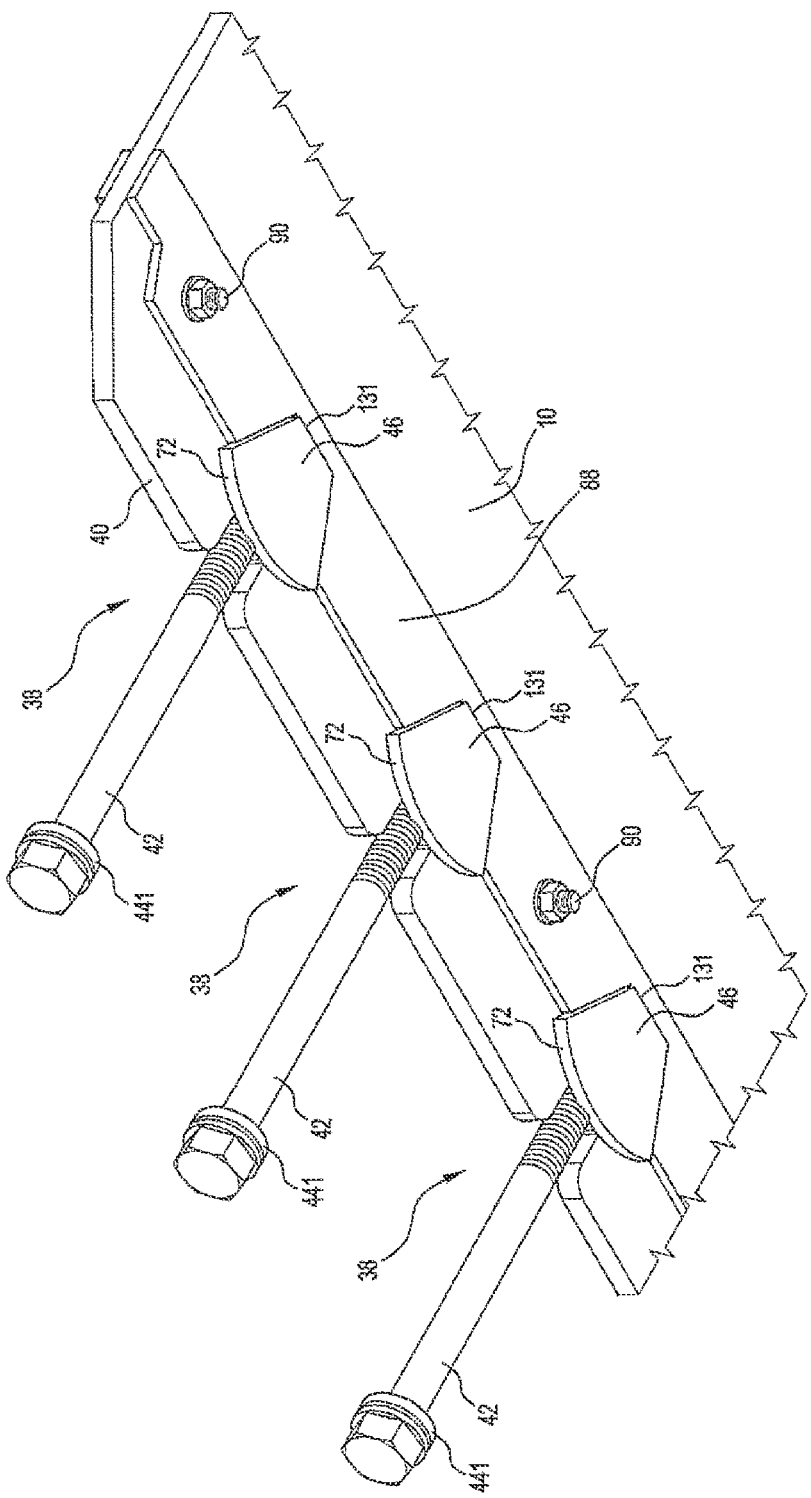
FIG. 17 is a partial perspective view from below that shows more completely the lower part of the system for retaining the coupling elements of the floor attachment system of the truck body shown in FIGS. 2 to 4.

In use, the following sequence of steps suspends the floor 10 in a required position in the remainder of the body 2. A first step is to position each coupling element 46 in the main section 52 of a recess 48 of the floor 10 as shown in FIG. 15. The main section 52 is slightly larger than the coupling element 46 to allow the coupling element 46 to be located in the main section 52. Once a line of the coupling elements 46 is located in respective recesses 48, top and bottom retaining plates 86 and 88 are positioned close to the inner face 131 of the coupling elements 46 and retain the coupling elements 46 in the recesses 48, with the coupling elements 46 being biased outwardly towards the side edge 40 of the floor so that the retaining flanges 70, 72 of the coupling elements 46 are located above and below the top and bottom surfaces 60, 62 of the floor 10 as shown in the figures. The retaining plates 86 and 88 are held to the floor 10 by a plurality of bolts 90 that extend through openings in the retaining plates 86 and 88 and also through openings 87 in the floor 10. The profile of the top and bottom retaining plates 86 ad 88 and the positioning of the retaining plates relative to the coupling elements 46 allows sufficient clearance for the before described swiveling movement of the coupling elements 46 relative to the floor 10. The retaining plates 86 and 88 may also retain a high viscosity grease around the enclosed parts of the coupling elements 46. The assembly of the floor 10 and the coupling elements 46 is then lifted into the body 2 and is safely supported in the required position in the body 2. At this point, the elongate elements 42 are inserted through the openings in the walls 80, 82 of the outermost longitudinal beams 32 and the threaded ends are rotated into the threaded openings of the coupling elements 46 (FIGS. 6, 16 and 17). A required tensioning of the elongate elements 42 and the coupling elements 46 is applied to properly suspend the floor 10 in position in the body 2. The height of the floor 10 relative to the rest of the body 2 is controlled by contact between the upper retaining plate 86 and the bottom surface of an abutment plate 89 attached to the outermost longitudinal beam 32 (see FIG. 6). At this point, the external support for the floor 10 can be removed, and the assembly of the floor 10 in the body 2 is complete.

Figure 18:
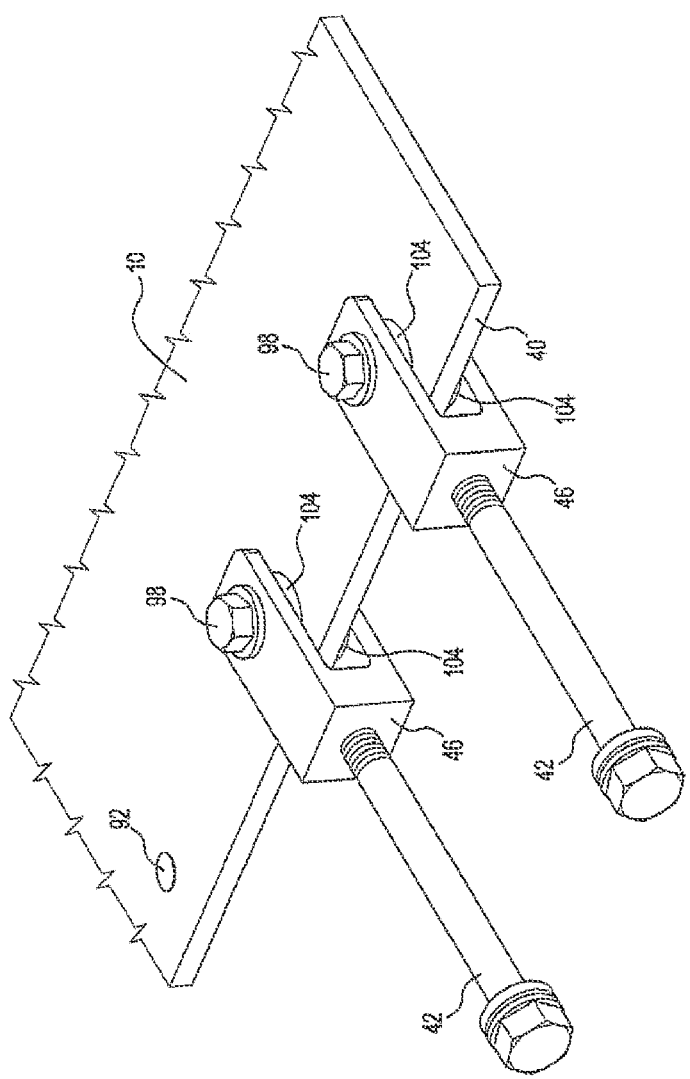
FIG. 18 is a perspective view of another, although not the only other, embodiment of a system for attaching a curved metal plate floor of a body of a vehicle to the remainder of the body in accordance with the present invention.
Figure 19:
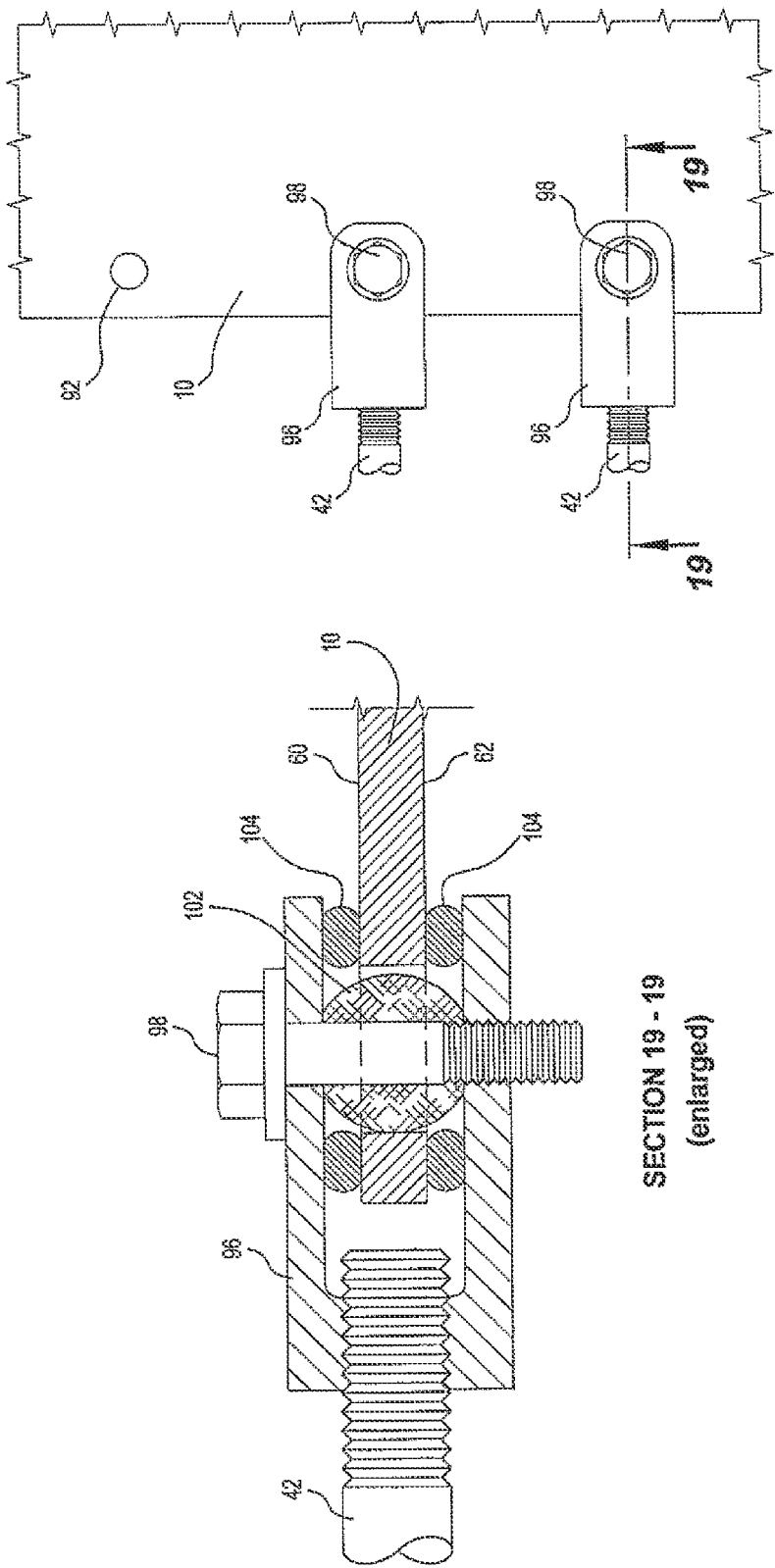
FIG. 19 provides two diagrammatic views showing more detail of the coupling system shown in FIG. 19.

The embodiment of the floor attachment system shown in FIGS. 18, 19 and 20 is similar to the embodiment shown in FIGS. 5 to 17 in that the system:

(a) includes elongate elements 42 that are at least the principal means for transferring forces from the floor 10 to the body 2, and (b) allows swiveling movement, i.e. multiple direction movement, between the coupling element 182 and the floor 10 of the body 2.

Instead of the recesses 48 of the embodiment described in relation to FIGS. 5 to 17, the system shown in FIGS. 18, 19 and 20 includes a plurality of openings 92 that extend through the floor 10 from the top surface 60 to the bottom surface 62 of the floor 10.

The system also includes tensile members 38 that include (a) the above-described elongate elements 42 and (b) coupling elements 46 in the form of clevis, clevis pin and bushing assemblies. Each assembly comprises a clevis 96 that has a threaded opening for the elongate element 42, a clevis pin 98, and a barrel shaped bushing 102 with the clevis pin 98 and the barrel shaped bushing 102 extending through an opening 90 in the floor 10.

The clevis pin 98 may be in the form of a threaded bolt. The clevis pin engages with the sides of openings 92 that extend through the floor 10 via a barrel shaped bushing 102. The barrel shape of the bushing allows rotation of the coupling clevis 96 relative to the floor 10 in both the longitudinal direction and the upward/downward direction (FIG. 20).

The cylindrical shaped elastomeric seals 104 centralise the coupling clevis 96 in the vertical direction relative to the floor 10. The compliance of the elastomeric material of the seals allows the coupling clevis 96 to rotate relative to the floor 10 in the upward/downward direction. The elastomeric seals also retain lubricating grease in the space around the barrel shaped bushing 102 and prevent the ingress of abrasive materials into this space.

Many modifications may be made to the preferred embodiments as described above without departing from the spirit and scope of the present invention.

By way of example, whilst the embodiment of the coupling member shown in FIGS. 5 to 17 is described as comprising a separate elongate and coupling elements 42, 46, it is noted that the present invention is not so limited and extends to arrangements in which the two elements 42, 46 are integrally formed.

What is claimed is:

1. A load carrying body for a vehicle, the load carrying body including a curved metal plate floor and a floor attachment system that attaches the floor to opposite sides of the body so that the floor is suspended between the sides, the floor attachment system including a plurality of tensile members, each of which is coupled at one end to one of the sides of the body of the vehicle and at the other end to a side edge of the floor, with each tensile member having a coupling element that is retained within a recess in the edge of the floor, with the tensile members being at least the principal means for transferring forces from the floor to the remainder of the body, with the coupling element being a formation that is received in and retained within the recess in the edge of the floor, with the coupling element including top and bottom flanges that locate the element in relation to top and bottom surfaces of the floor and retain the element in the recess, and with the coupling element and the recess being formed to allow swivelling movement of the coupling element in the recess in two mutually perpendicular directions to accommodate variations in alignment of the floor and the body.

2. The body defined in claim 1 wherein one of the two mutually perpendicular directions is a direction that is perpendicular to the plane of the floor at the side edge of the floor.

3. The body defined in claim 1 wherein the coupling element and the recess are formed to accommodate variations in alignment of the floor and the body in a longitudinal direction of the floor and the body.

4. The body defined in claim 1 wherein the tensile member includes an elongate element.

5. The body defined in claim 4 wherein the coupling element and the elongate element are separate elements that can be coupled together.

6. The body defined in claim 1 wherein the coupling element includes at least one abutment surface that is adapted to engage a corresponding abutment surface of the floor and allow swivelling movement of the coupling element in the recess.

7. The body defined in claim 6 wherein the abutment surface is curved about two mutually perpendicular axes.

8. The body defined in claim 1 wherein the recess is in the form of a notch.

9. The body defined in claim 1 wherein the recess is in the form of a cut-out section.

10. The body defined in claim 9 wherein the cut-out section is a key-hole shape.

11. The body defined in claim 1 wherein the tensile members are releasably coupled to one or both of the body and the floor to allow replacement of the floor.

12. The body defined in claim 1 wherein the tensile members apply a tension load to the floor plate at or close to a centre-line of the thickness of the plate.

13. A vehicle that includes the load carrying body having a curved metal plate floor and a floor attachment system that attaches the floor to the remainder of the body defined in claim 1.

14. The body defined in claim 1 wherein the formation is a nut.

15. A load carrying body for a vehicle, the load carrying body including a curved metal plate floor and a floor attachment system that attaches the floor to opposite sides of the body so that the floor is suspended between the sides, the floor attachment system including a plurality of tensile members, each of which is coupled at one end to one of the sides of the body of the vehicle and at the other end to a side edge of the floor, with each tensile member having a coupling element that is retained within a recess in the form of a notch in the edge of the floor, with the tensile members being at least the principal means for transferring forces from the floor to the remainder of the body, and with the coupling element and the recess being formed to allow swivelling movement of the coupling element in the recess in two mutually perpendicular directions to accommodate variations in alignment of the floor and the body.

16. The body defined in claim 15 wherein one of the two mutually perpendicular directions is a direction that is perpendicular to the plane of the floor at the side edge of the floor.

17. The body defined in claim 15 wherein the coupling element and the recess are formed to accommodate variations in alignment of the floor and the body in a longitudinal direction of the floor and the body.

18. The body defined in claim 15 wherein the tensile member includes an elongate element.

19. The body defined in claim 15 wherein the coupling element is a formation that is received in and retained within the recess in the edge of the floor.

20. The body defined in claim 19 wherein the coupling element includes top and bottom flanges that locate the element in relation to top and bottom surfaces of the floor and retain the element in the recess.

21. The body defined in claim 15 wherein the coupling element includes at least one abutment surface that is adapted to engage a corresponding abutment surface of the floor and allow swivelling movement of the coupling element in the recess.

22. The body defined in claim 21 wherein the abutment surface is curved about two mutually perpendicular axes.

23. The body defined in claim 15 wherein the tensile members are releasably coupled to one or both of the body and the floor to allow replacement of the floor.

24. The body defined in claim 15 wherein the tensile members apply a tension load to the floor plate at or close to a centre-line of the thickness of the plate.

25. A vehicle that includes the load carrying body having a curved metal plate floor and a floor attachment system that attaches the floor to the remainder of the body defined in claim 15.

26. A load carrying body for a vehicle, the load carrying body including a curved metal plate floor and a floor attachment system that attaches the floor to opposite sides of the body so that the floor is suspended between the sides, the floor attachment system including a plurality of tensile members, each of which is coupled at one end to one of the sides of the body of the vehicle and at the other end to a side edge of the floor, with each tensile member having a coupling element that is retained within a recess in the form of a cut-out section in the edge of the floor, with the tensile members being at least the principal means for transferring forces from the floor to the remainder of the body, and with the coupling element and the recess being formed to allow swivelling movement of the coupling element in the recess in two mutually perpendicular directions to accommodate variations in alignment of the floor and the body.

27. The body defined in claim 26 wherein one of the two mutually perpendicular directions is a direction that is perpendicular to the plane of the floor at the side edge of the floor.

28. The body defined in claim 26 wherein the coupling element and the recess are formed to accommodate variations in alignment of the floor and the body in a longitudinal direction of the floor and the body.

29. The body defined in claim 26 wherein the tensile member includes an elongate element.

30. The body defined in claim 26 wherein the coupling element is a formation that is received in and retained within the recess in the edge of the floor.

31. The body defined in claim 30 wherein the coupling element includes top and bottom flanges that locate the element in relation to top and bottom surfaces of the floor and retain the element in the recess.

32. The body defined in claim 26 wherein the coupling element includes at least one abutment surface that is adapted to engage a corresponding abutment surface of the floor and allow swivelling movement of the coupling element in the recess.

33. The body defined in claim 32 wherein the abutment surface is curved about two mutually perpendicular axes.

34. The body defined in claim 26 wherein the cut-out section is a key-hole shape.

35. The body defined in claim 26 wherein the tensile members are releasably coupled to one or both of the body and the floor to allow replacement of the floor.

36. The body defined in claim 26 wherein the tensile members apply a tension load to the floor plate at or close to a centre-line of the thickness of the plate.

37. A vehicle that includes the load carrying body having a curved metal plate floor and a floor attachment system that attaches the floor to the remainder of the body defined in claim 26.

* * * * *